JEROME KIDDER.

Improvement in Battery Current Insulators.

No. 120,750.

2 Sheets--Sheet 1.

Patented Nov. 7, 1871.

Witnesses:
Fred Haynes
R. E. Rabeau

Jerome Kidder M.D.

2 Sheets--Sheet 2.

JEROME KIDDER.
Improvement in Battery Current Insulators.

No. 120,750.　　　　　　　　　Patented Nov. 7, 1871.

Witnesses:
Fred Haynes
R. I. Rabeau

Jerome Kidder M.D.

AM. PHOTO-LITHOGRAPHIC CO. N.Y. (OSBORNE'S PROCESS.)

UNITED STATES PATENT OFFICE.

JEROME KIDDER, OF NEW YORK, N. Y.

IMPROVEMENT IN BATTERY-CURRENT MANIPULATORS.

Specification forming part of Letters Patent No. 120,750, dated November 7, 1871.

*To all whom it may concern:*

Be it known that I, JEROME KIDDER, of the city, county, and State of New York, have invented certain new and useful Improvements in Battery-Current Manipulators; and I do hereby declare that the following is a full, clear, and exact description of the same, reference being had to the accompanying drawing forming part of this specification, and in which—

Figure 2:
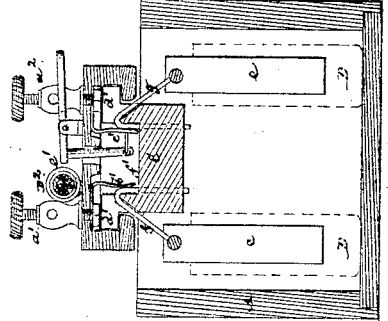
Figure 4:
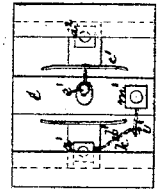
Figure 1:
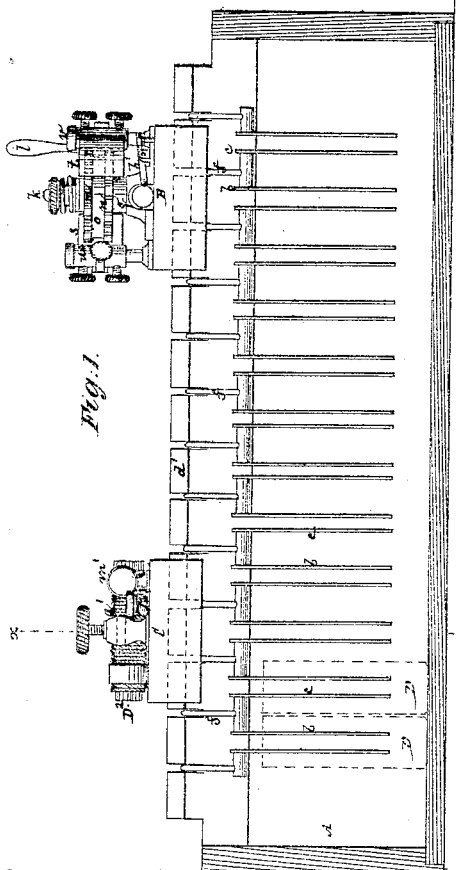
Figure 3:
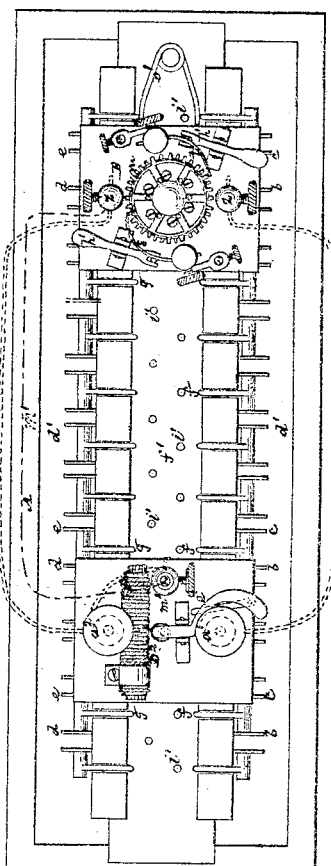
Figure 5:
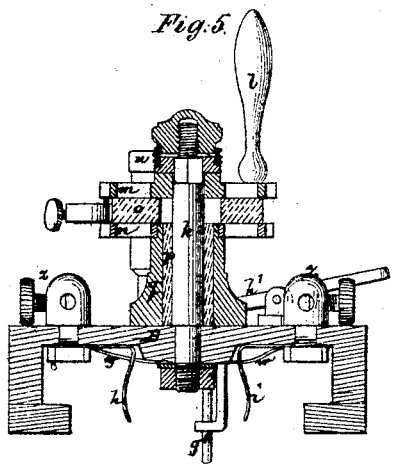
Figure 6:
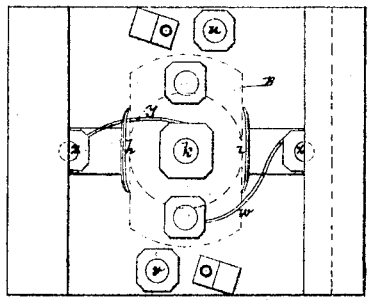

Figure 1 represents a side elevation, with the trough containing the batteries in section, of a battery-current manipulator constructed in accordance with my invention. Fig. 2 is a transverse section of the same through the line $x\ x$ in Fig. 1. Fig. 3 is a plan thereof, and Fig. 4 an under-side view of one of the slides used in the arrangement. Fig. 5 is a transverse section, and Fig. 6 an under-side view of another slide used in the arrangement.

Similar letters of reference indicate corresponding parts throughout the several figures.

My invention relates to electrical apparatus for electro-surgical uses and other purposes, in which a series of linearly-arranged batteries is used, and the same controlled or put into action, as required, by a slide or slides, through which the current is transmitted with more or less force to the patient or object, as circumstances direct. The invention consists in a slide provided with a pole-changer, composed of cogged wheels or devices, one of which is in connection with one pole of the battery, and the other with the other pole thereof; said cogged wheels or devices having combined with them pole-springs, which, as the cogged wheels or devices are moved, alternately first the one on the one cogged wheel or device and then the other on the other cogged wheel or device for the purpose of rapidly changing the direction of the current, as required. The invention also consists in an elongated construction of the springs which close on the batteries, relatively to the distance of the latter apart, on each side of the apparatus, whereby, as the slide carrying said springs is adjusted along the trough, said springs are made to close on the next battery in advance or before leaving the other battery on which they were closed, and so that, when the slide is located, said springs close upon one pole on each side of the apparatus. This part of the invention also includes a key, attached to one of said springs, for drawing it away from the wire-poles of the batteries, whereby the slide can be moved to take in a greater or less number of batteries without closing any of the batteries on the route. The invention likewise embraces a shifting connector, for the purpose of using a consecutive number of batteries on both sides of the apparatus. Furthermore, the invention consists in making the slide which closes the poles of the batteries the vehicle for carrying a helix or a system or combination of helices to the poles of the batteries so as to develop on said helix or helices the so-called extra and induced currents for use, either with or without the primary current accompanying the induced.

A in the accompanying drawing represents the box or trough in which the batteries are arranged and along which the slide or slides B C are moved; said batteries, as in other apparatus of the kind, are linearly disposed along opposite sides of the trough; D D being the cups, and $b\ c$ the metal plates of the one pole of each battery, and $d\ e$ the plates of the other pole thereof. $f$ and $g$ are the wire-poles of said batteries. The slide B, as in other battery-current manipulators, serves the purpose, accordingly as it is adjusted along the trough, of increasing or diminishing the number of batteries in the circuit and interrupts the circuit during such adjustment; at least such is the arrangement here represented for said slide by reason of the length of its springs $h$ and $i$ relatively to the distance apart of the wire-poles $f$ or $g$ with which they respectively connect. The novel feature of this slide B is its provision with a pole-changer or reverser, which is constructed as follows: Mounted on said slide is a post, $k$, around which are arranged, so as to be capable of rotation by a handle, $l$, wheels $m\ n$, having cogs or projections at suitable distances apart on their peripheries, and so that the cogs of the one wheel are disposed intermediately of the cogs of the other wheel. Said wheels are separated from each other as by an insulator, $o$, and the post $k$ is insulated, as at $p$, within a socket, $q$, on the slide. These wheels have combined with them pole-springs $s\ t$, attached to screw-cup holders $u\ v$, and each of a width so as to take in or bear upon both wheels. The wheel $n$ connects with the one pole of the battery by the socket $d$, wire $w$, and spring $i$ of the slide; and the other wheel, $m$, connects with the opposite pole of the battery by the post $k$, wire $y$, and spring $h$ of the slide; the wires $w$ and $y$ also serving, if required, to establish connection with screw-cups $z\ z$, by which the circuit may be made through both slides B C as by a connecting-wire or wires arranged to connect the screw-cups $z\ z$ with screw-cups $a^1\ a^2$ on slide C. On turning the wheels $m\ n$ the pole-springs $s\ t$ close alternately first the one on the one wheel and then the other on the other wheel for the purpose of rapidly changing the direction of the current, as required. It is not absolutely necessary that the parts $m\ n$ should be cogged wheels, as other cogged devices having a suitable motion and operating in concert with the pole-springs $s\ t$ might be used to effect the same purpose in a like rapid manner. The slide C has its springs $b'\ c'$, which connect respectively with the wire-poles $f\ g$, made elongated relatively to the distance of the wires $f$ or $g$ apart, so that, as said slide is adjusted along the trough or rails $d\ d$ thereof, said springs are caused to close upon the next succeeding battery before leaving the other battery upon which they were closed, and so that when the slide is located on the rails to work any given number of batteries, according to the power required, the springs $b\ c$ close upon one pole on each side. This feature of the invention allows for the adjustment of the slide without breaking the circuit in passing from battery to battery, and said feature is equally applicable to the other slide B; but in some cases it is more convenient to have it on a separate slide as it is here. When, however, it is desired to move the slide carrying the springs $b'\ c'$, so that it can be adjusted to take in a greater or less number of batteries without closing any of the batteries during the route or before the slide is located, then I remove the one $c'$ of said springs from contact with the wire-poles $g$ it passes by pressing and holding down on a key, $e'$, that is connected with said spring by wire or otherwise, and that on being relieved of pressure allows of said spring again coming into contact with the wire-pole $g$. $D^1$ is a shifting connector for the purpose of using any consecutive number of batteries on both sides of the apparatus by adjusting said connector so that it connects any one of the wire-poles $f$ with its opposite wire-pole $g$, such adjustment being made from either end of the apparatus. This shifting connector is made of a piece of wire twisted to form a coil at its middle and bent to produce elastic side leaves or arms, which press on the wire-poles $f\ g$ and between the rails $d\ d$ to hold said connector in place after it has been inserted between the rails and on the bed $f'$ at the point required in the series of opposite linearly-disposed batteries. Connected with the slide B are stops $g'\ g'$, operated by thumb-levers $h'\ h'$, and serving, when pressure is released from the levers, to shoot into lock with any two of a series of holes, $i'\ i'$, in the bed $f'$, to hold the slide at its set and in proper position relatively to the poles $f\ g$. Applied to the slide C, or it may be to the slide B, is a helix, $D^2$, or a system or combination of helices to the poles of the batteries. A single helix, $D^2$, however, with the slide C, as the vehicle for carrying the same, will suffice to explain. This helix has the one end of the coil represented as connecting with the spring $b'$ of the slide C by a wire, $k'$, and the other end of the coil as connecting by a wire, $l'$, with a screw-cup, $m^1$, so that there is developed on said helix or helices, if more than one, the so-called extra and induced currents, for use either with or without the primary current accompanying the induced currents. When the helix is used the screw-cups $a^1$ and $m^1$ are used instead of $a^1$ and $a^2$—a connection made from $m^1$ to one of the screw-cups $z$ of the slide B, as shown by the dotted line $m^2$, in Fig. 3.

What is here claimed and desired to be secured by Letters Patent, is—

1. The combination, with the slide C and series of linearly-disposed batteries, of a pole-changer, composed of cogged wheels or devices $m\ n$, and pole-springs $s\ t$ for operation in concert with the springs which close upon the poles of said batteries, substantially as specified.

2. The elongated springs $b'\ c'$ of either or one of the traveling slides, when arranged in relation with the poles $f\ g$ of the batteries as described, whereby said springs are made to close on a succeeding battery before leaving the other battery on which they were closed, and, when the slide is located, are caused to close upon one pole on each side of the apparatus.

3. The combination of the key $e'$ with either of the elongated springs $b'\ c'$ of the slide B or C, to which the latter are applied, essentially as herein set forth.

4. The shifting connector $D^1$ in combination with the poles $f$ and $g$ of the batteries, substantially as described.

5. In combination, with the slide which closes the poles of the batteries, a helix, $D^2$, or helices, carried by said slide, substantially as and for the purpose herein set forth.

JEROME KIDDER.

Witnesses:
 FRED. HAYNES,
 R. E. RABEAU.

(50)